July 1, 1969 R. WAGELE 3,452,434
METHOD OF MAKING HEAT RESISTANT ELECTRIC CABLE
Filed March 21, 1967

INVENTOR.
Rolf Wagele
BY
*Philip S. Hilbert*
ATTORNEY 3,452,434
METHOD OF MAKING HEAT RESISTANT
ELECTRIC CABLE
Rolf Wagele, Langenhagen, Germany, assignor to Kabel-
und Metallwerke Gutehoffnungshutte Aktiengesell-
schaft, Hannover, Germany, a corporation of Germany
Filed Mar. 21, 1967, Ser. No. 624,846
Claims priority, application Germany, Mar. 31, 1966,
H 58,981
Int. Cl. H01b 13/06, 13/22
U.S. Cl. 29—624                           2 Claims

ABSTRACT OF THE DISCLOSURE

A heat resistant or fireproof electrical cable which includes a corrugated metal sheath to impart flexibility to the cable and composite spacing and filler means of dielectric heat resistant material for embedding a conductor within the sheath and spacing the same relative to the sheath, together with a method of forming such cable in a continuous manner.

Background of the invention

The invention pertains to flexible electrical cables which are heat resistant or fireproof.

Various procedures are known for making electrical cables of the heat resistant type. Thus, in one such method, strips of magnesium are wrapped about the electrical conductor and the assembly inserted into a metal sheath. Steam under pressure is introduced into the filled sheath to convert the magnesium to magnesium oxide which swells and fills all cavities within the sheath. However such a procedure does not lend itself to making cable of continuous length and is limited to making cables of limited length. Further, such cables are still and do not bend easily.

In another known procedure, as set forth in German Patent No. 490,582, conductors are inserted into a tubular metal sheath and retained in spaced relation to each other by the insertion of solid ceramic dielectric into the spaces between the sheath and the conductors. The resultant assembly is reduced to a desired section by the use of hammers or drawing dies. In this process the ceramic dielectric is broken up and condensed to such an extent that the outer diameter of the sheath and of the conductors is reduced. Also, in the drawing process the conductors may be displaced within the comminuted dielectric, thereby adversely affecting the resistance values between individual conductors. Here again, the length of cable is limited; the cable is heavy and relatively inflexible.

Accordingly, an object of this invention is to provide a novel electrical cable having a corrugated metal sheath with conductors disposed within the sheath and maintained in a determined space relation by a combination of dielectric spacer means and flowable embedding means also of a dielectric character; such cable lending itself to formation in continuous lengths and of minimized weight; and showing over the entire length thereof a high and substantially constant insulation resistance between the conductors and between the conductors and the metal sheath.

Another object of this invention is to provide an improved, light weight, flexible electrical cable which is heat resistant or fireproof and which may be formed by a simplified procedure using standard cable forming equipment so as to achieve increased production rates and total cable output.

Summary of the invention

The cable of the instant invention may comprise one or more electrical conductors carried in a transversely corrugated metal sheath with dielectric spacers and powdered dielectric material maintaining the spacing of the conductors relative to each other and relative to the metal sheath; the spacers being adapted to maintain their original solid form or to be reduced to comminuted form; the dielectric material of the spacers and the powdered fill being selected in accordance with the extent of resistance to heat and fire desired.

Description of the preferred embodiments

The electric cable of the instant invention includes essentially an assembly of one or more electrical conductors and spacer members of dielectric material mounted at spaced intervals along the conductors to fix their relative spacing; such assembly being associated with a metal strip which has been converted to tubular form with an open seam which permits the introduction of powdered dielectric material into the spaces between the spacer members; the seam being then closed as by welding or the like. The resultant assembly is then passed through a corrugating machine for transversely corrugating the metal sheath.

The specific dielectric used for the spacers and the flowable or powdered material embedding the conductors, is selected in terms of the required properties of the cable. Thus, a fireproof cable must be non-combustible and capable of withstanding for short time periods, temperatures up to 1000° C. Heat resistant cables need only withstand temperatures within the range of from 300 to 400° C., and such cable need not be non-combustible.

Accordingly, for fireproof cables, it is desirable to use as the flowable dielectric, known high-temperature resistant metal oxides such as magnesium oxide, zirconium oxide, thorium dioxide, silicon dioxide in crystalline or sand form, and the like. If the cable is to be heat resistant, then the flowable dielectric may take the form of a pasty material such as the silicone resins. Such resins upon decomposition due to exposure to excessive temperatures, will be converted to silicon dioxide which is also a dielectric.

The spacer members which are assembled with the conductors before incorporating the same in the metal sheath, are formed from ceramics or sintered materials having dielectric properties; the same being in fired or unfired form. In the former case, the spacer members maintain their form in the finished cable, whereas in the latter case, the spacer members may be reduced to particle or comminuted form.

Figure 1:
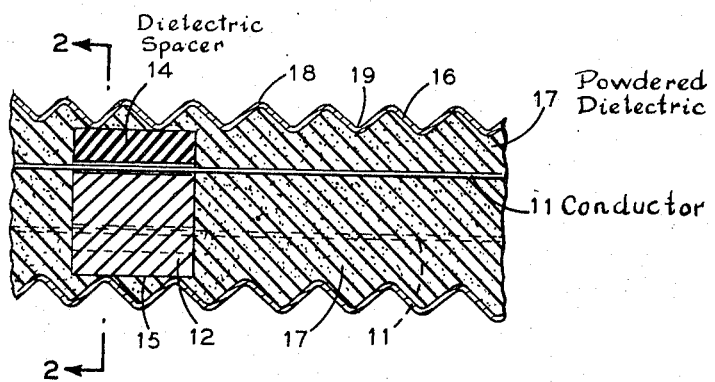
FIG. 1 is a longitudinal sectional view showing a cable embodying the invention.
Figure 2:
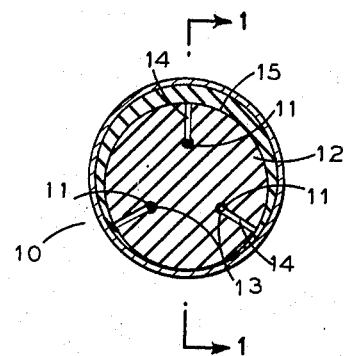
FIG. 2 is a transverse sectional view taken on the line 2—2 of FIG. 1.

As shown in FIGS. 1, 2; 10 designates an electric cable embodying the invention. The same comprises electrical conductors 11 which are assembled with a plurality of spacer members in the form of circular ceramic discs 12. Each disc 12 is formed with a set of through openings 13 and radial slots 14 communicating at their inner ends with said openings 13 and extending outwardly to the peripheral edge 15 of the disc. Thus, spacer discs 12 may be mounted at suitable intervals on conductors 11 by way of slots 14 in openings 13.

Figure 3:
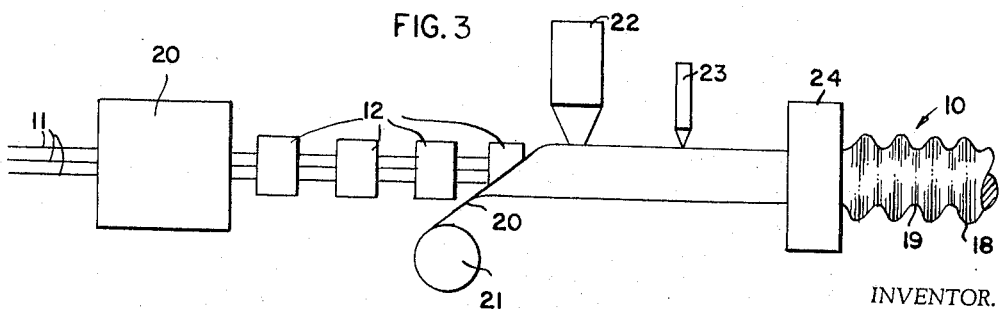
FIG. 3 is a diagrammatic showing of the method of making heat resistant electric cable in accordance with the invention.

The cable 10 is formed, as shown in FIG. 3, by passing conductors 11 in a given path to an assembly station 20, where spacer members 12 are suitably mounted on said conductors 11 at spaced intervals along the length thereof. The assembly of conductors 11 and spacer members 12 then passes to a station where sheath 16 is formed around the assembly by drawing metal strip 20 from a supply reel 21 and forming the same into tubular shape about the assembly, by means well known in the art, not shown. The adjacent longitudinal edges of the strip 20 in its tubular form provide a longitudinal slot through which the powdered dielectric 17 is passed from supply hopper 22 to fill the spaces in said sheath 16 between spacer members 12.

The longitudinal seam in sheath 16 is then closed by welding as at 23, in a known manner; and the entire assembly moves through a corrugating station, where known corrugating devices 24, corrugate sheath 16 to form alternating peaks 18 and valleys 19. The diameter of discs 12 is such that in the corrugating process, the valleys 19 of sheath 16 will abut the peripheral edge portion 15 of said discs. The discs 12 have an axial dimension, preferably at least twice the distance between two adjacent valleys 19; whereby good bearing surface for the corrugated sheath 16 relative to spacer members 12, to absorb incident pressures. Such axial dimension of spacers 12 allows for good flexibility in the finished cable.

The spacing between adjacent spacer discs 12 should be of an order so as to limit the volume between adjacent spacer discs to limit the amount of powdered dielectric introduced therein during the cable forming operation and thus avoid excessive amounts of such dielectric and incident loss of the same. However, too close a spacing of the disc 12 will adversely affect the flexibility of the finished cable. It has been found that optimum results are attained with a thickness of spacer discs 12 being the measure of the spacing between such discs.

The spacer members mounted on conductors 11 may be formed of molded ceramic material but not fired. In this case, such spacer members will have a diametral dimension substantially equal to the inside diameter of the smooth tubular metal sheath, before the same is corrugated. Preferably, such spacer members are of non-circular shape, as for example, they may be of triangular shape, thus providing passages for movement of the introduced powdered dielectric 17. Alternatively, the spacer members may be of circular shape, in which case axial openings are provided therein to form passages for powdered dielectric 17. In any case, when the cable is corrugated, the frangible unfired spacer members will be crushed, thus providing a substantially homogeneous comminuted refractory dielectric throughout the extent of the cable which augments the flexibility of the cable.

The consistency of powdered dielectric 17 may be modified as to viscosity by adding small amounts of silicone oil to the powdered material, thereby limiting migration of the powdered material 17 along the length of the cable. Such silicone oils at high temperatures develop minimal amounts of gas.

The tubular metal sheath 16 is preferably formed from a temperature-resistant metal such as alloyed steel or anodized aluminum, the metals being in a scale free condition. For heat resistant cables the sheath may be formed of copper. The sheath 16 may be protected from corrosion by jacketing the same with non-metallic coverings including glass fiber, asbestos, kaolin, and the like.

The cable of the instant invention is readily made by using known equipment including a tube forming station where a metal strip is progressively bent into tubular sheath form with a longitudinal gap between the strip edges at which point the flowable dielectric is fed into the tube within which the spacer-conductor assembly is positioned. A welding station is used to close the longitudinal seam in the sheath and a draw-off means as of the caterpillar type, is used to pass the cable assembly through a corrugating station where the sheath is transversely corrugated. Preferably, the assembly line including the several indicated units, is at a small incline with respect to the horizontal, to thereby facilitate the filling of the sheath with the powdered or flowable dielectric.

What is claimed is:
1. A method of forming flexible heat resistant electric cable comprising moving at least one electrical conductor along a given path, successively mounting heat resistant spacer members on said moving conductor at spaced intervals along the length thereof, supplying a metal strip, continuously forming said strip into a tubular sheath about the moving assembly of conductor and spacer members while providing a longitudinal slot defined by the adjacent longitudinal edges of said metal strip, introducing flowable heat resistant dielectric material into said sheath and between said spacer members by way of said slot, thereafter continuously seaming the adjacent longitudinal edges of said metal strip and then transversely corrugating said tubular sheath.

2. A method as in claim 1 wherein said spacer members are of circular shape with a diameter less than the diameter of the formed tubular sheath, whereby upon corrugation of said tubular sheath, valley portions of said tubular sheath will abut peripheral portions of said spacer members.

References Cited
UNITED STATES PATENTS

| | | |
|---|---|---|
| 2,077,282 | 4/1937 | Strom et al. |
| 2,888,546 | 5/1959 | Kinney. |
| 2,888,656 | 5/1959 | Bremer _____ 174—77 X |
| 2,941,905 | 6/1960 | Hofman. |
| 3,141,232 | 7/1964 | Russell _____ 29—615 X |
| 3,287,490 | 11/1966 | Wright. |

FOREIGN PATENTS

| | | |
|---|---|---|
| 1,180,860 | 6/1959 | France. |
| 401,082 | 11/1933 | Great Britain. |
| 21,147 | 10/1891 | Great Britain. |
| 43,423 | 6/1938 | Netherlands. |

LEWIS H. MYERS, *Primary Examiner.*

A. T. GRIMLEY, *Assistant Examiner.*

U.S. Cl. X.R.

174—102, 118; 338—224